United States Patent [19]
Jaeger

[11] 3,795,162
[45] Mar. 5, 1974

[54] METHOD AND APPARATUS FOR TRIMMING PLASTIC BOTTLES

[76] Inventor: Ben E. Jaeger, 204 S. Brodge St., Yorkville, Ill. 60560

[22] Filed: Feb. 5, 1973

[21] Appl. No.: 321,157

[52] U.S. Cl. ............... 83/23, 83/160, 83/161, 83/401, 83/444, 83/599, 83/605, 83/914, 425/806
[51] Int. Cl. ............................................. B29c 17/10
[58] Field of Search ..... 83/914, 160, 161, 401, 444, 83/599, 605, 23; 425/806

[56] References Cited
UNITED STATES PATENTS

| | | | |
|---|---|---|---|
| 3,228,086 | 1/1966 | Brown et al | 83/914 UX |
| 3,377,899 | 4/1968 | Wolford | 83/914 X |
| 3,458,897 | 8/1969 | Roger | 83/914 X |
| 3,464,084 | 9/1969 | Thompson | 83/914 X |
| 3,533,132 | 10/1970 | Rupert et al | 83/914 X |
| 3,695,109 | 10/1972 | Uhlig | 83/914 X |

*Primary Examiner*—Frank T. Yost
*Attorney, Agent, or Firm*—Gary, Juettner, Pigott & Cullinan

[57] ABSTRACT

Bottles or other containers formed by blow molding are trimmed to remove the flashings at the bottom, top, and in the handle opening. The bottles are supported in an upright position and are rapidly trimmed while hot and pliable by a swinging arm having cutting tools that conform to and skim the contour of the bottle. The cutting tools have curved or tapered surfaces relative to the plane of the flashings that engage the flashings from one side and curl them away from the bottle in a one step operation.

21 Claims, 9 Drawing Figures

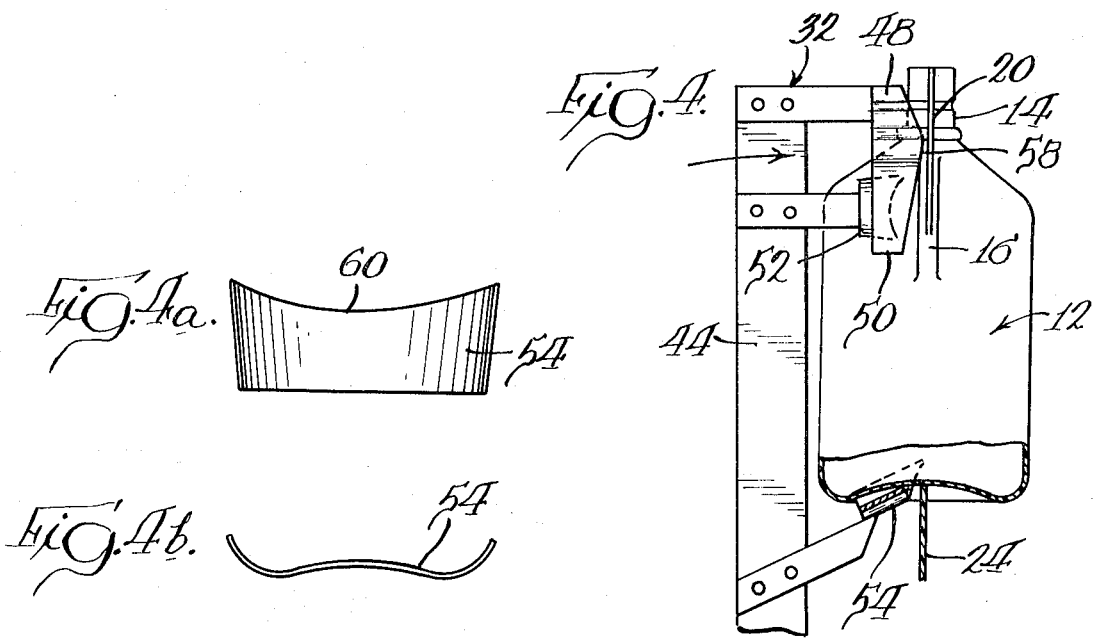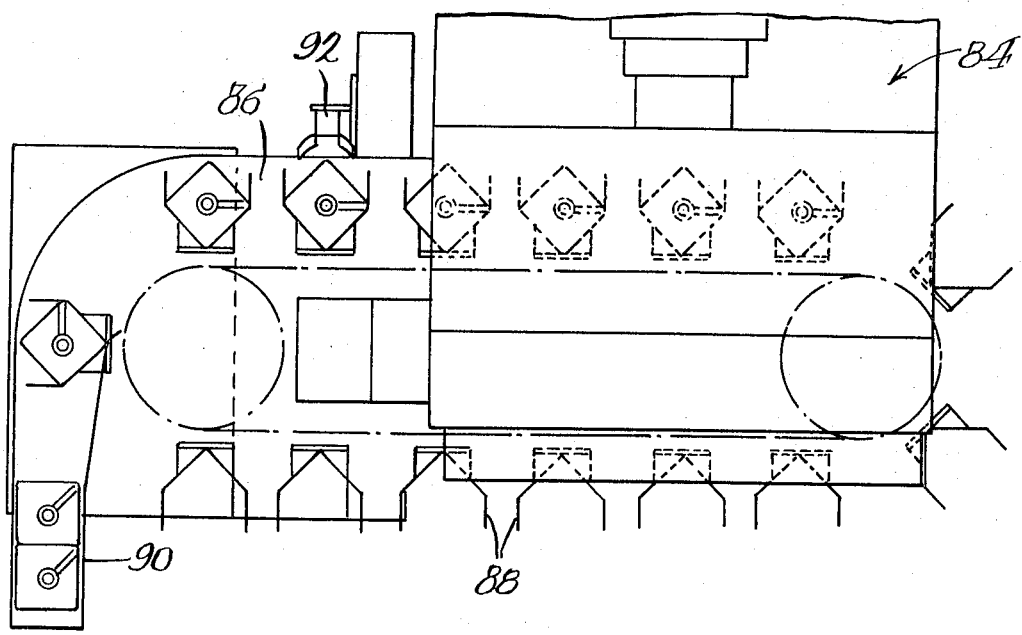

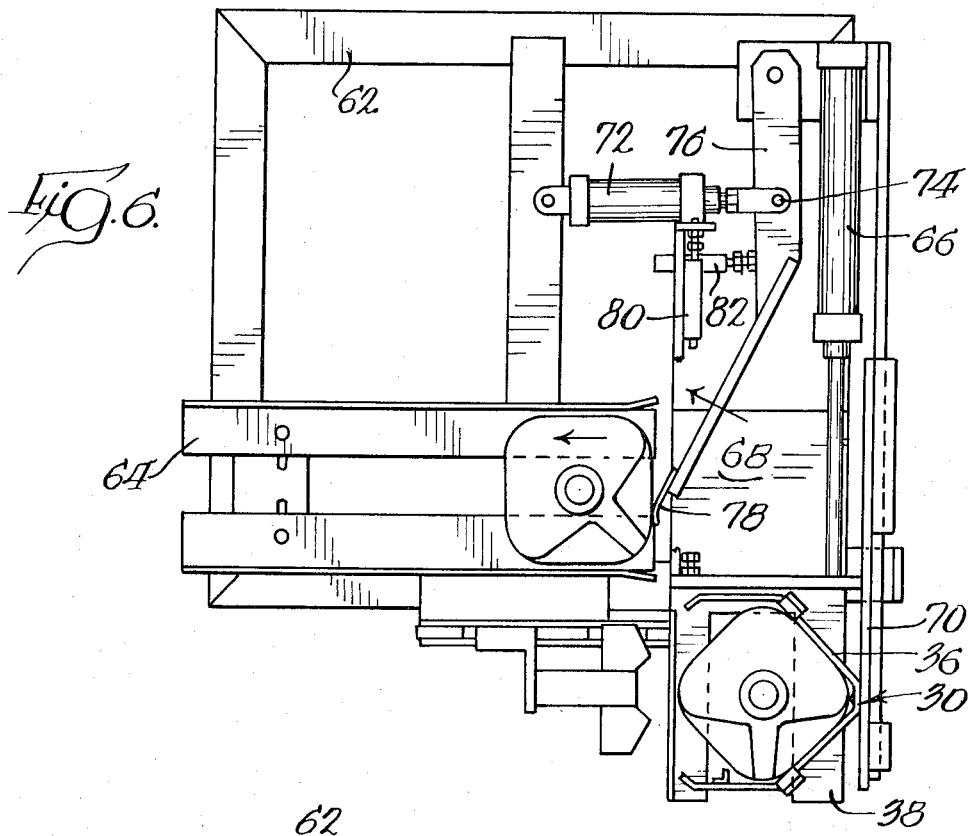
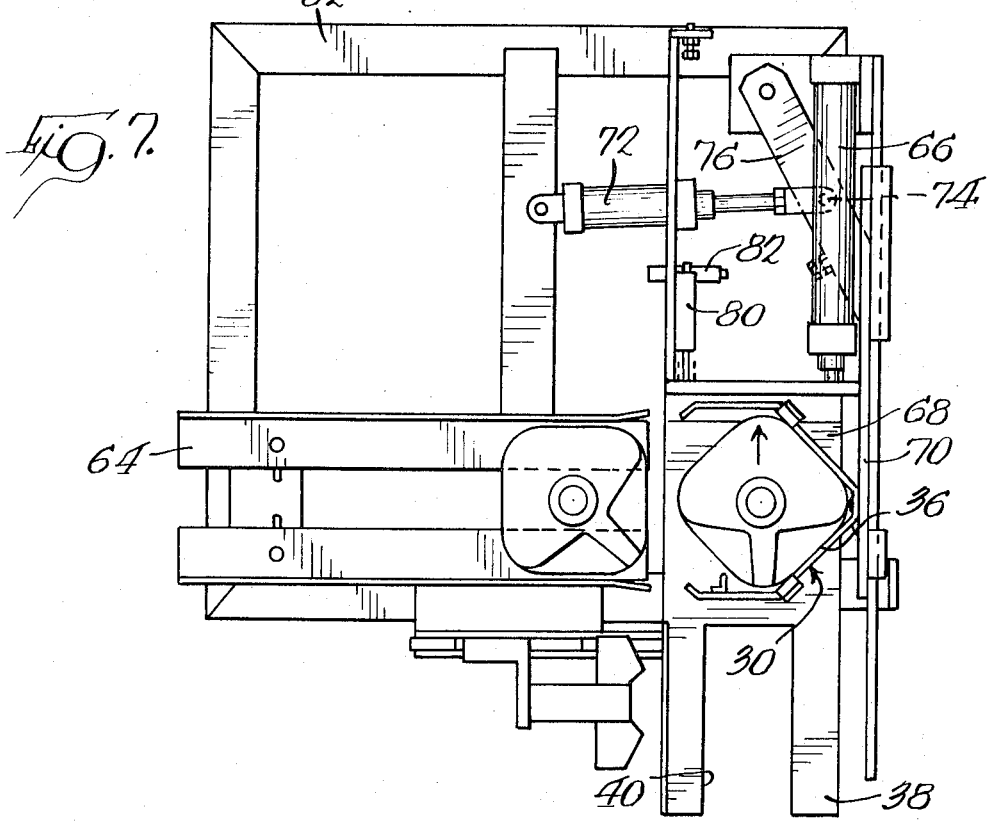

METHOD AND APPARATUS FOR TRIMMING PLASTIC BOTTLES

BACKGROUND OF THE INVENTION

This invention relates to a method and apparatus for trimming plastic bottles and the like, said method and apparatus being particularly adapted to cooperate with a blow molding machine to trim bottles issuing therefrom in a rapid and efficient manner.

In a well-known blow molding process, bottles or other containers or articles are formed from an extruded parrison between a pair of mating mold halves, whereupon the mold halves separate and the molded article is ejected. In most operations of this nature, flashings or fins of excess plastic material are formed at the parting line at or near the top and bottom of the bottle in a plane where the mold halves are in engagement. The flashings must then be removed in a separate operation, either by hand or by machine.

Of the currently available devices for removing flashings, most comprise mating dies that engage and grip around the neck and at the bottom of the bottle. In order to function properly, the bottle must be sufficiently cooled and rigid to retain its shape under the force of the dies. For this reason, bulky cooling tables occupying considerable premium floor space must be provided in the molding room. Another disadvantage is that most conventional operations require that the bottles be placed on their side for cooling and trimming, and a separate operation is then required to return the bottles to an upright position to be conveyed away for packing or storage.

A further difficulty with the use of mating trimming dies resides in the variable nature of the molding process and the possible variation of shape and dimension of successive bottles issuing from similar molds. Since the dies are operable only upon a fixed shape, slight variations of the shape may result in an imperfect or incomplete trim, thereby requiring time consuming and costly hand trimming to complete the finishing operation before the bottle may be commercially used.

SUMMARY OF THE INVENTION

The present invention overcomes the difficulties mentioned above by providing an apparatus capable of skimming the contour of the bottle immediately after the bottle has issued from the mold in an upright position and while the flashings are in a hot and pliable condition. The body of the bottle is held in a fixed position in a support pocket having an open top and a slot in the bottom to expose the area of the bottle where the flashings are located.

A plurality of cutting elements are mounted on a swinging arm and are shaped to skim the contour of the bottle in the area of the flashings. The cutting elements are curved or sloped relative to the plane of the flashings, which allows for progressive shearing of the flashings, thereby reducing the impact on and possible crushing of the bottle as the flashings are being removed. The cutting elements shear or curl the hot flashings away from the bottle along their natural parting line, without subjecting the bottle to severe gripping forces that would distort the shape of the bottle.

The trimming apparatus operates to remove flashings about the neck and handle, including handle opening, of the bottle, as well as the "tail" or flashing with projects from the bottom of the bottle. Since most bottles have a concave bottom surface, the swinging radius of the arm approximates the radius of the concave bottom and allows engagement of the trimmer element with the flashing near its parting line.

The apparatus is operative to conduct successive bottles into the holding position from trimming and then onto an exit conveyor while the next bottle is received from trimming. The apparatus is activated in response to the operation of the mold, in order to provide automatic, continuous operation.

THE DRAWINGS

FIG. 4 is a fragmentary end elevational view of the apparatus of FIG. 1 showing the trimming arm as it engages the flashings of the bottle;

FIGS. 4a and 4b are respective top and end views of the lower trimming element;

FIG. 5 is a simplified plan view of one form of conveyor that may be employed in connection with a multiple molding apparatus; and FIGS. 6 and 7 are plan views of an indexing shuttle mechanism operative to hold and eject the bottles during the trimming operation, FIG. 6 showing a bottle in trim position and FIG. 7 showing the position of the bottle in an eject position.

DESCRIPTION OF THE PREFERRED EMBODIMENT

Figure 1:
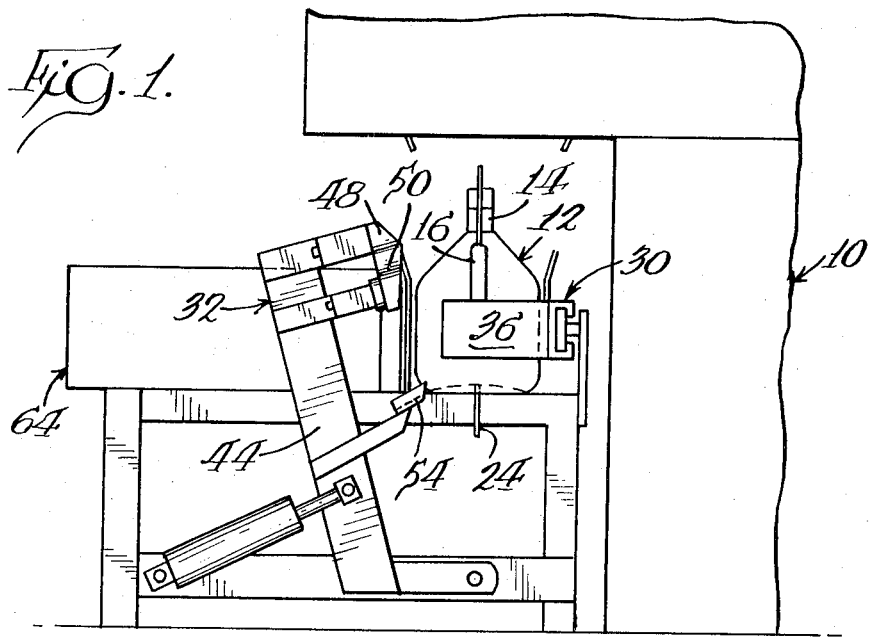
FIG. 1 is an elevational view of the apparatus of the present invention, illustrating a bottle in position ready to be trimmed.

The apparatus of the present invention is intended for use in connection with a blow molding machine, a portion of which is shown in outline at 10 in FIG. 1. The blow molding machine may be of any of the well-known types and generally includes a pair of opposed mold sections which are closed in mating position during blowing of a molten extruded parrison, which sections are then opened to eject the molded product either downward or to one side. Although the invention will be described particularly in connection with a blow molding machine that discharges a molded product downward, it is apparent that the principles of the invention can be adapted to machines which discharge the molded product in other directions.

Figure 2:
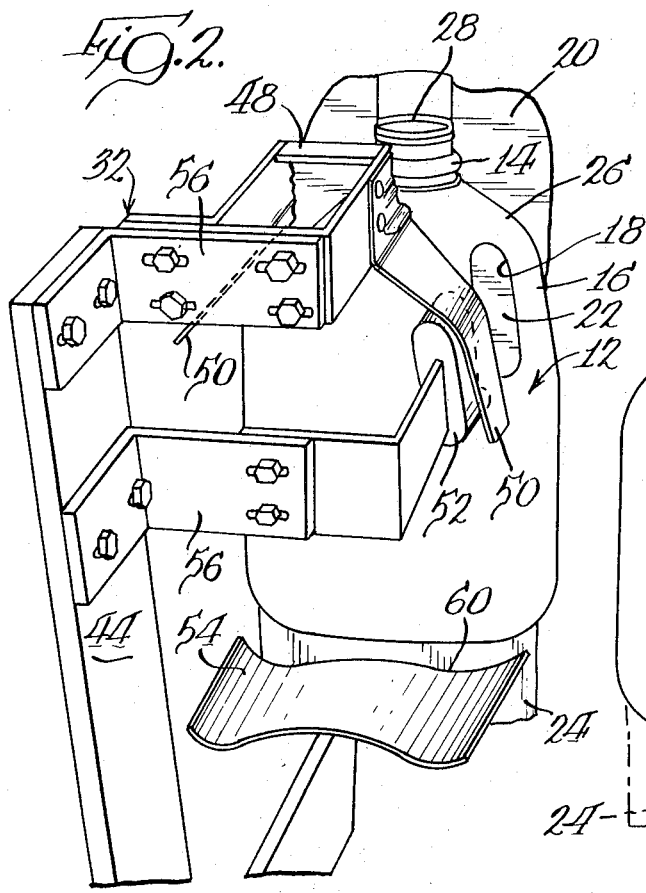
FIG. 2 is a perspective view showing the relationship between the cutting head of the present invention with respect to a bottle to be trimmed.
Figure 3:
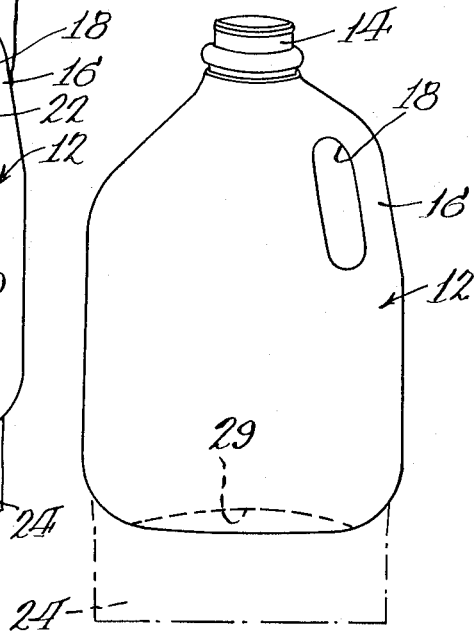
FIG. 3 is an elevational view of the bottle upon completion of the trimming operation.

The present invention will also be described in connection with the trimming of bottles 12 having a neck 14 and a handle portion 16 with an opening 18 therein, although it will be appreciated that the trimming apparatus will have application to other molded forms and to bottles and containers of various shapes and sizes. As shown in FIG. 2, the bottle 12 or other article issuing from the mold will carry flashings, such as in the area of the neck at 20, in the handle opening at 22 and at the bottom 24, such flashings being formed incidental to the blow molding operation in the area where the mold sections meet. The flashings 20, 22 and 24 are located in a common vertical plane and are attached to the body of the bottle along a thin parting line 26, with the possible exception of the open top 28, from which the flashings may be separated from the rim of the neck by means of special equipment in the mold. In addition, the bottom of a typical bottle comprises a concave surface 29 from which the bottom flashing or "tail" projects.

In connection with the present invention, it has been discovered that it is relatively easy to remove or trim the flashings from the bottle immediately or shortly after it has issued from the mold. Upon issuing from the mold, the bottle, usually composed of a plastic such as high density polyethylene or similar material, is sufficiently rigid and firm to hold its shape, and the flashings are pliable or semi-soft and are joined to the bottle by a relatively thin band of plastic at the parting line. Within this relatively short period, the flashings may be removed or torn from the bottle very easily without distorting the shape of the bottle.

If the bottle is allowed to cool for any appreciable length of time, the flashings become extremely tough and difficult to remove by tearing or trimming. The exact time interval and temperature beyond which trimming becomes difficult is dependent upon the molding temperature as well as the composition and properties of the plastic, but it is preferable that the trimming or removal operation be completed within several seconds after the bottle issues from the mold.

The apparatus of the present invention generally comprises receptacle means, generally indicated at 30, having a pocket for catching and loosely holding or supporting the bottle in an upright position as it issues from the mold, trimming means, generally indicated at 32, for removing the flashings from the bottle as it is held in the receptacle means, and means, such as shown in FIGS. 5 through 7, for rapidly moving the bottle to and from the position required for operation thereon by the trimming means.

The trimming apparatus is located in close proximity to the blow molding apparatus 10, preferable beneath the outlet 34 where the bottles are discharged in a hot and pliable condition. Each bottle falls directly into the receptacle means 30, is immediately trimmed, and then is moved away as another bottle is received and trimmed.

As shown in FIGS. 1, 6 and 7, the receptacle means 30 comprises an open-top holder 36 adapted to receive and loosely hold a single bottle in an upright position. The holder 36 is substantially completely open at one side to allow entrance and operation of the bottle trimming elements from that side and is also shaped to expose the flashings at the top, bottom and sides of the bottle. In the case of the four sides bottle shown, the holder 36 is in the form of a V-shaped vertical wall adapted to extend around the three corners of the bottle below the handle portion thereof. The bottom of the bottle is supported upon a bottom plate 38 (FIGS. 6 and 7) secured in the stationary framework of the apparatus, said plate having a slot 40 therein through which the bottom flashing 24 may extend without obstruction. The holder 36 is thus designed to catch and support the bottle in an upright position while leaving the flashings unobstructed and exposed at one side to allow removal. It will be noted that the flashings located around the parting line on the bottle are orientated perpendicular to, and face the open side of the holder 36.

The trimming means 32 comprises a rigid arm 44 pivotally mounted at one end on a support such that the other end is swingable toward and away from the open side of the bottle holder 36 on a line substantially perpendicular to the plane of the flashings 20, 22 and 24. The arm is adapted for rapid swinging movement toward and away from the bottle by means of connection to a reversible power means, such as a double acting pneumatic power cylinder 45 (FIG. 1) having a cylinder end pivotally connected to a support and the rod end connected to a central portion of the arm 44. The arm 44 swings preferably about a radius which is approximately the same as the radius of the concave bottom surface 29 of the bottle, which allows for more efficient trimming of the bottom flashing, as will be hereinafter more fully described.

One or more sets of cutting or trimming elements are secured near the free end of the arm 44 and project therefrom, such that the trimming surfaces thereof face the parting line 26 and the flashings on a bottle when in trim position. The trimming elements are shaped to skim the contour of the bottle in the area of the flashings. The elements need not be constructed of particularly hard or sharp materials and may in fact be constructed from sheets or blocks of aluminum or the like.

As best shown in FIGS. 1, 2, 4, 4a, and 4b, the trimming elements may comprise a top horizontal member 48 that is adjusted to skim the top of the bottle, and a pair of diverging arms 50 extending downward from the sides of the top member and being shaped to correspond to the contour of the bottle 12. The trim element for the handle opening comprises a solid member 52 that corresponds to the shape of the opening 18. In addition, a separate bottom trim element in the form of a contoured and curved blade 54 (FIGS. 4a and 4b) is secured to the arm 44 below the handle and side trimming elements, the bottom element being adapted to arch up into the concave bottom 29 of the bottle and remove the bottom flashing 24. All of the trim elements are preferably secured to the arm 44 by means of adjustable brackets 56, as shown in FIG. 2.

As mentioned, the cutting elements are secured to the arm 44 so as to skim the contour bottle in the area of the flashings. The trim elements are shaped to engage the flashings closely adjacent to the bottle surface at the parting line 26. The surfaces of the trim elements that face the flashings are also curved or slanted relative to the plane of the flashings such that the engagement of the trim elements with the flashings defines a slicing action therewith, and thereby simultaneously curls all of the flashings away from and completely free of the body of the bottle.

As best shown in FIGS. 2 and 4, the cutting surfaces 58 of the diverging arms 50 each taper away from a central pointed area relative to the plane of the flashings. In this manner, the pointed area engages the flashings first, whereupon continued movement of the cutting surfaces causes progressive shearing and curling of the flashings at the parting line, thereby reducing the peak force applied to the bottle and preventing it from being crushed.

As best shown in FIG. 4, the handle opening trim element 52 is of a shape corresponding to the shape of the handle opening. The cutting surface of element 52 is also curved inward from the top and bottom in a concave fashion and is hollowed out to cause the handle flashing to be curled away from the opening.

The shape of the bottom trim element 54 is best shown in FIGS. 4a and 4b. The cutting surface 60 is curved inward from the sides such that the tail flashing is curled away from the bottle. When viewed from one end as shown in FIG. 4b, it may be seen that the element 54 is also contoured to correspond to the bottom concave surface of the bottle, with the central portion being concave and the ends curving upward. As shown in FIG. 4, the element 54 is mounted on an upward slant from the arm 44, and the arm swings through an arc corresponding to the concave bottom surface 29 of the bottle. In this manner, the cutting surface 60 is able to engage the flashing near the parting line and cleanly curl the flashing away, rather than fold it over.

The contoured cutting surfaces of the aforesaid trimming elements serve several important functions. The flashings are progressively sheared away without imposing a sudden concentrated impact on the bottle. Moreover, the flashings are curled as they are removed, which gives them additional structural rigidity and causes them to break cleanly free from the bottle rather than to fold to one side and hang onto the bottle.

The shuttle means shown in FIGS. 6 and 7 are connected to the bottle holders 36 and serve to rapidly and automatically move the bottles from a first position where successive bottles are trimmed, to a second position where the bottles are ejected onto a conveyor to be moved away for subsequent packaging or storage. The shuttle comprises a framework 62 that supports the entire trimming apparatus and includes the slotted bed 38 for supporting the bottles as they issue from the mold, as well as a guideway 64 laterally spaced from the bed, which extends to an external conveyor (not shown). The guideway 64 comprises a pair of spaced upstanding channel members and serves to align the bottles in a single file after the trimming operation has been completed.

A first double acting power cylinder 66 is connected at one end to the framework 62 and at the other end to the bottle holder 36 in order to move the holder from a trim position on the slotted base 38 to an eject position where the bottle rests on a solid plate 68 supported in the framework. The holder 36 is slidably engaged with a guiderail 70 which serves to guide the holder in a linear horizontal direction under influence of the reciprocating power cylinder.

The guideway 64 is arranged at right angles to the direction of movement of the rod of a first power cylinder 66 and is laterally spaced from the slotted base 38 but in register and alignment with the solid support plate 68. Means are provided to push a trimmed bottle from the solid plate 68 onto the guideway 64 comprising a second double acting power cylinder 72 connected at one end to the framework 62 and at the other end to the fulcrum 74 of the lever 76 pivotally attached at one end to the framework, and the other end having a flattened pushing element 78 secured thereto for pushing a bottle in a direction indicated by the arrow in FIG. 6. It will be noted that lever 76 is mounted substantially parallel to the first cylinder 66, and the cylinder 72 is mounted parallel with the guideway 64, whereby the bottle is moved at substantially a right angle from the trim position to the eject position.

The bottom of the receptacle means 30 is provided with a lug 91 secured on the outer half of the receptacle means at the bottom near the open side thereof. The lug 91 engages a lower corner of the bottle as it is being pushed by the pusher 78 and causes the bottle to rotate an eighth revolution as it is being pushed onto the guideway 64. In this manner, the bottles exiting on the guideway 64 are aligned with their side surfaces parallel, which greatly facilitates subsequent handling and packing.

In operation, a bottle ejected from the blow molding apparatus is received in the holder 36 in trim position as shown in FIG. 6. After the bottle has been trimmed, the first cylinder 66 is activated to move the holder and the bottle onto the solid plate 68. The second cylinder 72 is then energized to push the bottle at right angles onto the guideway 64 while the holder is returned to trim position to receive another bottle.

The above sequence is rendered automatic by means of fluid switches that are connected to each of the operative portions of the trimming apparatus and serve to actuate the next successive step of the trimming and shuttling operation. Thus, a first switch is responsive to the closing of the mold apparatus, which activates the trim arm 44 to trim the previously ejected bottle. Completion of the trimming operation in turn activates the first cylinder 66, which moves the bottle out of trim position and into eject position and activates the next switch as shown at 80 in FIG. 7. Activation of switch 80 in turn activates the second cylinder 72 to eject the bottle and to close the switch as shown at 82 in FIG. 6. Activation of switch 82 serves to return the holder to the receiving position, which resets the switch 80, causing the cylinder 72 to extend and return the pusher arm, thereby clearing the apparatus for operation upon the next successive bottle.

Another form of shuttle or conveying mechanism is shown in FIG. 5, such mechanism being operative to handle a plurality of bottles ejected from a multiple molding apparatus 84. The mechanism of FIG. 5 comprises a semi-continuous oval conveyor 86 haVing a plurality of bottle holders 88 mounted thereon, said holders being similar in construction to those previously described. The conveyor 86 leads to a second conveyor 90 unto which the trimmed bottles are ejected. One of a plurality of trimming apparatuses 92 of the type herein described are located to one side of the molding apparatus and are activated to trim successive bottles as they pass thereby. The conveyor is moved in a timed sequence so as to coordinate successive bottles with the stroke of a trimming apparatus.

Obviously, the principles of the present apparatus can be devices which handle a plurality of bottles simultaneously along with one or a plurality of trimming arms. Also, a single arm may carry two sets of trimming elements which trim a pair of bottles held in adjacent separate pockets.

What is claimed is:

1. Method for trimming flashings from a thermoplastic article issuing from a mold comprising the steps of catching the article as it issues from the mold, and then while the flashings is in a hot and pliable condition, skimming the contour of the article in the area of the flashings from a direction substantially perpendicular thereto, whereby said flashings are parted and removed from said article.

2. A method for removing the flashings from a blow extruded plastic bottle issuing from a mold, comprising the steps catching the molded bottle in an upright first position as it issues from the mold, and then while said bottle is in a hot and pliable condition with the flashings attached along the parting line, trimming the flashings from said bottle by rapidly moving trimming elements against all of said flashings simultaneously with said bottle in an upright position, said elements moving in a line substantially perpendicular to said flashings, and then moving said bottle in an upright position away from said first position to a second position removed from said trimming elements.

3. The method of claim 2 wherein the step of moving said bottle away from said first position comprises the steps of moving the bottle to a second position adjacent to a conveyor, and pushing the bottle onto the conveyor.

4. The method of claim 3 comprising the further steps of catching another bottle to be trimmed while a previously trimmed bottle is being pushed onto said conveyor.

5. The method of claim 2 wherein a plurality of bottles are caught as they issue from the mold and are thereafter trimmed.

6. The method of claim 5 wherein the bottles are trimmed individually.

7. The method of claim 5 wherein the bottles are trimmed simultaneously.

8. The method of claim 2 wherein said bottle is trimmed simultaneously in one motion of said trimming elements in the area of its neck, handle and bottom.

9. The method of claim 2 wherein said trimming elements establish a progressive shearing action with said flashings at said parting line and curl the flashings away from the bottle.

10. Apparatus for trimming and handling blow extruded articles issuing from a mold and having flashings attached thereto along a parting line, comprising pocket means for catching an article immediately upon issuance from the mold, said pocket means holding said article in a stationary position with said flashings being exposed on one side, and movable trimming means for skimming the contour of the article in the area of the flashings while said article and flashings thereof are in a hot and pliable condition, said trimming means approaching and engaging said flashings from said one side.

11. The apparatus of claim 10 wherein said trimming means comprises a lever, means for pivotally mounting said lever, power means for moving one end of said lever toward and away from said article, and trim elements secured near said one end of the lever engageable with said flashings.

12. The apparatus of claim 11 wherein said trim elements comprise members shaped to conform to a portion of the contour of said article in the area of said flashings, said members being engageable with said flashings at said parting line.

13. The apparatus of claim 11 wherein said members are slanted or curved relative to the surface of said flashings, whereby to create a progressive shearing effect upon engagement therewith.

14. The apparatus of claim 12 wherein said members comprise a top trim means for engaging the top flashing of the article, said trim means for engaging flashings at the sides of the article, and bottom trim means for engaging the flashings at the bottom of said article.

15. The apparatus of claim 14 wherein said article comprises a bottle having a handle opening formed therein, and said side trim means comprises a shaped member engageable with the contour of said opening.

16. The apparatus of claim 14 wherein said bottle has a bottom concave surface, and wherein said arm and said bottom trim means swings through an arc corresponding substantially to the curvature of the bottom surface of said bottle.

17. Apparatus of claim 10 further comprising shuttle means for moving said article from said stationary position in coordination with said trimming means to a second position away from said trimming means.

18. Apparatus of claim 17 comprising a guideway adjacent said second position, and pusher means for moving said article from said second position onto said guideway.

19. The apparatus of claim 18 wherein said trimming means, shuttle means and pusher means operate in automatic sequence.

20. The apparatus of claim 18 wherein said shuttle means comprise a power cylinder connected to said pocket means for moving said pocket means in a linear direction, guide means for guiding said pocket in said linear direction, and said pusher means comprises a power operated lever movable into and out of engagement with said article in said second position.

21. A method for trimming flashings from a plastic article issuing from a mold comprising catching the article as it issues from the mold and holding the article with the flashings exposed, and curling the flashings away from the article while in a hot and pliable condition by imparting a progressive shearing action thereto near the junction between the flashings and the article.

* * * * *